(12) United States Patent
Hayden et al.

(10) Patent No.: US 9,614,228 B2
(45) Date of Patent: Apr. 4, 2017

(54) COMPOSITE MATERIALS

(71) Applicant: Ilika Technologies, Ltd., Chilworth, Southampton Hampshire (GB)

(72) Inventors: Brian Elliott Hayden, Chilworth (GB); Jonathan Conrad Davies, Chilworth (GB); Laura Jane Offin, Chilworth (GB)

(73) Assignee: Ilika Technologies, Ltd., Southampton Hampshire (GB)

( * ) Notice: Subject to any disclaimer, the term of this patent is extended or adjusted under 35 U.S.C. 154(b) by 0 days.

(21) Appl. No.: 14/653,042

(22) PCT Filed: Jan. 16, 2014

(86) PCT No.: PCT/GB2014/050120
§ 371 (c)(1),
(2) Date: Jun. 17, 2015

(87) PCT Pub. No.: WO2014/111716
PCT Pub. Date: Jul. 24, 2014

(65) Prior Publication Data
US 2015/0372316 A1 Dec. 24, 2015

(30) Foreign Application Priority Data
Jan. 16, 2013 (GB) .................................. 1300822.2

(51) Int. Cl.
| | |
|---|---|
| *H01M 4/02* | (2006.01) |
| *H01M 4/92* | (2006.01) |
| *B01J 23/42* | (2006.01) |
| *B01J 32/00* | (2006.01) |
| *C01G 35/00* | (2006.01) |
| *H01M 4/88* | (2006.01) |
| *H01M 4/90* | (2006.01) |

(52) U.S. Cl.
CPC ............ *H01M 4/925* (2013.01); *B01J 23/42* (2013.01); *B01J 32/00* (2013.01); *C01G 35/00* (2013.01); *H01M 4/8825* (2013.01); *H01M 4/9075* (2013.01); *C01P 2002/54* (2013.01)

(58) Field of Classification Search
CPC . B01J 23/42; B01J 32/00; C01G 35/00; C01P 2002/54; H01M 4/8825; H01M 4/9075; H01M 4/925; Y02E 60/50
See application file for complete search history.

(56) References Cited

U.S. PATENT DOCUMENTS

| | | | |
|---|---|---|---|
| 5,723,404 A | 3/1998 | Bütje et al. | |
| 6,783,569 B2 | 8/2004 | Cheon et al. | |
| 7,053,021 B1 | 5/2006 | Zhong et al. | |
| 7,704,918 B2 | 4/2010 | Adzic et al. | |
| 7,855,021 B2 | 12/2010 | Adzic et al. | |
| 2005/0085379 A1 | 4/2005 | Ishihara et al. | |
| 2006/0263675 A1 | 11/2006 | Adzic et al. | |
| 2007/0026292 A1 | 2/2007 | Adzic et al. | |
| 2007/0031722 A1 | 2/2007 | Adzic et al. | |
| 2007/0037041 A1 | 2/2007 | Cai et al. | |
| 2007/0082257 A1 | 4/2007 | Tamura et al. | |
| 2007/0105005 A1 | 5/2007 | Tolmachev | |
| 2007/0264492 A1 | 11/2007 | Mizuno et al. | |
| 2008/0008924 A1 | 1/2008 | Xiong et al. | |
| 2008/0220296 A1 | 9/2008 | Eichhorn et al. | |
| 2009/0065738 A1 | 3/2009 | Weidner et al. | |
| 2009/0114061 A1 | 5/2009 | Strasser et al. | |
| 2009/0117257 A1 | 5/2009 | Monnier et al. | |
| 2010/0105548 A1 | 4/2010 | Zhang et al. | |
| 2010/0197490 A1 | 8/2010 | Adzic et al. | |
| 2012/0122019 A1* | 5/2012 | DiSalvo, Jr. ........... | B82Y 30/00 429/524 |
| 2012/0202683 A1* | 8/2012 | Shirvanian ............... | B01J 23/42 502/339 |
| 2012/0309615 A1 | 12/2012 | Shao et al. | |
| 2013/0022899 A1 | 1/2013 | Arai et al. | |
| 2013/0136687 A1 | 5/2013 | Darr et al. | |
| 2015/0333337 A1 | 11/2015 | Hayden et al. | |
| 2015/0333338 A1 | 11/2015 | Hayden et al. | |

FOREIGN PATENT DOCUMENTS

| | | |
|---|---|---|
| CN | 101455970 A | 6/2009 |
| EP | 1 524 711 | 4/2005 |
| EP | 1 859 861 A1 | 11/2007 |

(Continued)

OTHER PUBLICATIONS

Cappellani, A., et al., "Processing and Characterisation of Sol-Gel Deposited Ta$_2$O$_5$ and TiO$_2$—Ta$_2$O$_5$ Dielectric Thin Films", *Solid-State Electronics*, vol. 43, No. 6 (1999), pp. 1095-1099.
Harry, G.M., et al., "Titania-Doped Tantala/Silica Coatings for Gravitational-Wave Detection", *Classical and Quantum Gravity*, Institute of Physics Publishing, vol. 24, (2007), pp. 405-415.
International Search Report for PCT/GB2014/050120, dated Apr. 11, 2014.
Antolini, E., et al., "Ceramic Materials as Supports for Low-Temperature Fuel Cell Catalysts", *Solid State Ionics*, vol. 180 (2009), pp. 746-763.
Cappellani, A., et al., "Processing and Characterisation of Sol-gel Deposited Ta2O5 and TiO2—Ta2O5 Dielectric Thin Films", *Solid State Electronics, Elsevier Science Publishers*, vol. 43, No. 6 (1999), pp. 1095-1099.

(Continued)

*Primary Examiner* — Patrick Ryan
*Assistant Examiner* — Ben Lewis
(74) *Attorney, Agent, or Firm* — Brinks Gilson & Lione

(57) ABSTRACT

A mixed metal oxide material of tantalum and titanium is provided for use in a fuel cell. The material may comprise between 1 and 20 at. % tantalum. The mixed metal oxide may form the core of a core-shell composite material, used as a catalyst support, in which a catalyst such as platinum forms the shell. The catalyst may be applied as a single monolayer, and is preferably between 6.5 and 9.3 monolayers thick.

21 Claims, 10 Drawing Sheets

(56) References Cited

FOREIGN PATENT DOCUMENTS

| | | |
|---|---|---|
| EP | 1 925 592 | 5/2008 |
| EP | 2 557 203 | 2/2013 |
| JP | 2000-237588 | 9/2000 |
| JP | 2002219361 | 8/2002 |
| JP | 2004-259908 | 9/2004 |
| JP | 2005-013946 | 1/2005 |
| JP | 2005-100713 | 4/2005 |
| WO | WO 99/56872 | 11/1999 |
| WO | WO2008/025751 | 3/2008 |
| WO | WO 2009/041543 | 4/2009 |
| WO | WO2009/152003 | 12/2009 |
| WO | WO 2009/157033 | 12/2009 |
| WO | WO 2010/005773 | 1/2010 |
| WO | WO2010/135576 | 11/2010 |
| WO | WO2010/135576 A2 | 11/2010 |
| WO | WO 2011/065471 | 6/2011 |
| WO | WO 2012/041340 | 4/2012 |
| WO | WO 2012/105978 | 8/2012 |
| WO | WO 2012/125138 | 9/2012 |
| WO | WO 2012/144974 | 10/2012 |
| WO | WO 2013/013704 | 1/2013 |

OTHER PUBLICATIONS

Chen,Y., et al., "Atomic Layer Deposition Assisted Pt—$SnO_2$ Hybrid Catalysts on Nitrogen-Doped CNTs with Enhanced Electrocatalytic Activities for Low Temperature Fuel Cells", *International Journal of Hydrogen Energy*, vol. 36 (2011), pp. 11085-11092.

Cui, X., et al., "Graphitized Mesoporous Carbon Supported Pt—$SnO_2$ Nanoparticles as a Catalyst for Methanol Oxidation", *Fuel*, vol. 89 (2010), pp. 372-377.

De Bruijn, F.A., et al., "Review: Durability and Degradation Issues of PEM Fuel Cell Components", *Fuel Cells*, vol. 8, No. 1 (2008), pp. 3-22.

Gasteiger, H.A., et al., "Activity Benchmarks and Requirements for Pt, Pt-alloy, and non-Pt Oxygen Reduction Catalysts for PEMFCs", *Applied Catalysis B: Environmental*, vol. 56 (2005), pp. 9-35.

Guerin, S., et al., "Physical Vapor Deposition Method for the High-Throughput Synthesis of Solid-State Material Libraries", *J. Comb. Chem.*, vol. 8 (2006), pp. 66-73.

Guerin, S., et al., "Combinatorial Electrochemical Screening of Fuel Cell Electrocatalysts", *J. Comb. Chem.*, vol. 6 (2004), pp. 149-158.

Guerin, S., et al., "High-Throughput Synthesis and Screening of Ternary Metal Alloys for Electrocatalysis", *J. Phys. Chem. B*, vol. 110 (2006), pp. 14355-14362.

Guo, D-J., et al., "Highly Catalytic Activity of Pt Electrocatalyst Supported on Sulphated SnO2/multi-walled Carbon Nanotube Composites for Methanol Electro-Oxidation", *Journal of Power Sources*, vol. 198 (2012), pp. 127-131.

Harry, Gregory M., et al., "Titania-doped Tantala-silica Coatings for Gravitational-Wave Detection", *Classical and Quantum Gravity, Institute of Physic Publishing*, vol. 24, No. 2 (2007), pp. 405-415.

Hartl, K., et al., "AuPt Core-shell Nanocatalysts with Bulk Pt Activity", *Electrochemistry Communications*, vol. 12 (2010), pp. 1487-1489.

Hayden, B.E., et al., "The influence of Support and Particle Size on the Platinum Catalysed Oxygen Reduction Reaction", *Physical Chemistry Chemical Physics*, vol. 11 (2009), pp. 9141-9148.

Huang, S-Y., et al., "Electrocatalytic Activity and Stability of Niobium-Doped Titanium Oxide Supported Platinum Catalyst for Polymer Electrolyte Membrane Fuel Cells", *Applied Catalysis B: Environmental*, vol. 96 (2010), pp. 224-231.

Huang, S-Y., et al., "Development of a Titanium Dioxide-Supported Platinum Catalyst with Ultrahigh Stability for Polymer Electrolyte Membrane Fuel Cell Applications", *J. Am., Chem. Soc.*, vol. 131 (2009), pp. 13898-13899.

Ma, Y., et al. "High Active PtAu/C Catalyst with Core-Shell Structure for Oxygen Reduction Reaction", *Catalysis Communications*, vol. 11 (2010), pp. 434-437.

Peuckert, M., et al., "Oxygen Reduction on Small Supported Platinum Particles", *Journal of the Electrochemical Society*, vol. 133, No. 5 (1986), pp. 944-947.

Sasaki, K., et al., "Core-Protected Platinum Monolayer Shell High-Stability Electrocatalysts for Fuel-Cell Cathodes", *Angewandte Chemie International Edition*, vol. 49, No. 46, (2010), pp. 8602-8607.

Silva, J.C.M., et al., "Ethanol Oxidation Reactions Using $SnO_2$@Pt/C as an Electrocatalyst", *Applied Catalysis B: Environmental*, vol. 99 (2010), pp. 265-271.

Wang, R., et al., "Carbon Supported Pt-Shell Modified PdCo-core with Electrocatalyst for Methanol Oxidation", *International Journal of Hydrogen Energy*, vol. 35 (2010), pp. 10081-10086.

Wang, R., et al., "Preparation of Carbon-Supported Core@shell PdCu@PtRu Nanoparticles for Methanol Oxidation", *Journal of Power Sources*, vol. 195 (2010), pp. 1099-1102.

Wang, S., et al., "Controlled Synthesis of Dendritic Au@Pt Core-shell Nanomaterials for Use as an Effective Fuel Cell Electrocatalyst", *Nanotechnology*, vol. 20. No. 2 (2009), 025605 (9 pages).

Wang, W., et al., "Pt Overgrowth on Carbon Supported PdFe Seeds in the Preparation of Core-shell Electrocatalysts for the Oxygen Reduction Reaction", *Journal of Power Sources*, vol. 195 (2010), pp. 3498-3503.

Wei, Z.D., et al. "Electrochemically Synthesized Cu/Pt Core-shell Catalysts on a Porous Carbon Electrode for Polymer Electrolyte Membrane Fuel Cells", *Journal of Power Sources*, vol. 180 (2008), pp. 84-91.

Wu, Y-N., et al., "High-Performance Core-shell PdPt@Pt/C Catalysts via Decorating PdPt Alloy Cores with Pt", *Journal of Power Sources*, vol. 194 (2009), pp. 805-810.

Xu, Z., et al., "Effect of Particle Size on the Activity and Durability of the Pt/C Electrocatalyst for Proton Exchange Membrane Fuel Cells", *Applied Catalysis B: Environmental*, vol. 111-112 (2012), pp. 264-270.

Ye, J., et al., "Preparation of Pt Supported on $WO_3$-C with Enhanced Catalytic Activity by Microwave-Pyrolysis Method", *Journal of Power Sources*, vol. 195 (2010), pp. 2633-2637.

International Preliminary Report on Patentability for PCT/GB2014/050120, dated Jul. 21, 2015.

Du, Q., et al., "Pt@Nb—$TiO_2$ Catalyst Membranes Fabricated by Electrospinning Atomic Layer Deposition", *ACS Catal.*, vol. 4 (2014), pp. 144-151.

Liu, M., et al., "PdAg Nanorings Supported on Graphene Nanosheets: Highly Methanol-Tolerant Cathode Electrocatalyst for Alkaline Fuel Cells", *Adv. Funct. Mater.*, vol. 23 (2013), pp. 1289-1296.

Garsany, Y., "Experimental Methods for Quantifying the Activity of Platinum Electrocatalysts for the Oxygen Reduction Reaction", *Anal. Chem.*, vol. 82 (2010), pp. 6321-6328.

Nguyen, S.T., et al., "Ethanol Electro-Oxidation Activity of Nb-doped-$TiO_2$ Supported PdAg Catalysts in Alkaline Media", *Applied Catalysis B: Environmental*, vol. 113-114 (2012), pp. 261-270.

Choi, I., et al., "Preparation of $Pt_{shell}$-$Pd_{core}$ Nanoparticle with Electroless Deposition of Copper for Polymer Electrolyte Membrane Fuel Cell", *Applied Catalysis B: Environmental*, vol. 102 (2011), pp. 608-613.

Karim, N.A., et al., "An Overview on Non-Platinum Cathode Catalysts for Direct Methanol Fuel Cell", *Applied Energy*, vol. 103 (2013), pp. 212-220.

Pernstich, K.P., et al., "Electroless Plating of Ultrathin Films and Mirrors of Platinum Nanoparticles onto Polymers, Metals, and Ceramics", *Applied Materials & Interfaces*, vol. 2, No. 3 (2010), pp. 639-643.

Imai, H., et al., "Structural Defects Working as Active Oxygen-Reduction Sites in Partially Oxidized Ta-Carbonitride Core-Shell Particles Probes by Using Surface-Sensitive Conversion-Electron-Yield X-ray Absorption Spectroscopy", *Applied Physics Letters*, vol. 96 (2010), pp. 191905-1 to 191905-3.

(56) References Cited

OTHER PUBLICATIONS

Nava, N., et al., "Tin-Platinum Catalysts Interactions on Titania and Silica", *Applied Surface Science*, vol. 253 (2007), pp. 9215-9220.

Lee, J-M., et al., "TiO$_2$@carbon Core-Shell Nanostructure Supports for Platinum and Their Use for Methanol Electrooxidation", *Carbon*, vol. 48 (2010), pp. 2290-2296.

Shrestha, S., et al., "Electrocatalytic Activity and Stability of Pt Clusters on State-of-the-Art Supports: A Review", *Catalysis Reviews: Science and Engineering*, vol. 53 (2011), pp. 256-336.

Fresno, F., et al., "Synthesis of Ti$_{1-x}$Sn$_x$O$_2$ Nanosized Photocatalysts in Reverse Microemulsions", *Catalysis Today*, vol. 143 (2009), pp. 230-236.

Ji, J., et al., "Catalytic Activity of Core-Shell Structured Cu/Fe$_3$O$_4$@SiO$_2$Microsphere Catalysts", *Catalysis Today*, vol. 158 (2010), pp. 305-309.

Yao, L., et al., "Core-Shell Structured Nickel and Ruthenium Nanoparticles: Very Active and Stable Catalysts for the Generation of CO$_x$-free Hydrogen Via Ammonia Decomposition", *Catalysis Today*, (2010), doi:10.1016/j.cattod.2010.10.056.

Chen, C.C., et al., "The Enhancement of Platinum Surface Area by Alumina Template Assistance in Sn/Pt Core-Shell Nano/sub-micron Sphere Structure", *Ceramics International*, vol. 39 (2013), pp. 4369-4375.

Kim, H-W., et al. "Preparation of Supported Ni Catalysts on Various Metal Oxides with Core/Shell Structures and their Tests for the Steam Reforming of Methane", *Chemical Engineering Journal*, (2010), doi:10.1016/j.cej.2010.11.045.

Meier, J., et al., "Nano-Scale Effects in Electrochemistry", *Chemical Physics Letters*, vol. 390 (2004), pp. 440-444.

Aaltonen, T., et al., "Atomic Layer Deposition of Platinum Thin Films", *Chem. Mater.*, vol. 15 (2003), pp. 1924-1928.

Aryanpour, M., et al., "Tungston-Doped Titanium Dioxide in the Rutile Structure: Theoretical Considerations", *Chem. Mater.*, vol. 21 (2009), pp. 1627-1635.

Mackus, A.J.M., et al., "Influence of Oxygen Exposure on the Nucleation of Platinum Atomic Layer Deposition: Consequences for Film Growth, Nanopatterning, and Nanoparticle Synthesis", *Chem. Mater.*, vol. 25 (2013), pp. 1905-1911.

DOE Hydrogen and Fuel Cells Program, "V.E.1 Polymer Electrolyte Fuel Cell Lifetime Limitations: The Role of Electrocatalyst Degradation", FY 2011 Annual Progress Report, pp. 783-787 (Nov. 2011).

DOE Hydrogen Program, "IV.C.3, Low Platinum Loading Catalysts for Fuel Cells", FY 2004 Progress Report, pp. 384-388 (Nov. 2004).

Serov, A., et al., "Highly Active and Durable Templated Non-PGM Cathode Catalysts Derived from Iron and Aminoantipyrine", *Electrochemistry Communications*, vol. 22 (2012), pp. 53-56.

Li, W., et al., "Nano-Structured Pt—Fe/C as Cathode Catalysts in Direct Methanol Fuel Cell", *Electrochimica Acta*, Vo. 49 (2004), pp. 1045-1055.

Vukmirovic, M.B., et al. "Platinum Monolayer Electrocatalysts for Oxygen Reduction", *Electrochimica Acta*, vol. 52 (2007), pp. 2257-2263.

Mayrhofer, K.J.J., et al., "Measurement of Oxygen Reduction Activities via the Rotating Disc Electrode Method: From Pt Model Surfaces to Carbon-Supported High Surface Area Catalysts", *Electrochimica Acta*, vol. 53 (2008), pp. 3181-3188.

Ishihara, A., et al., "Progress in Non-Precious Metal Oxide-Based Cathode for Polymer Electrolyte Fuel Cells", *Electrochimica Acta*, vol. 55 (2010), pp. 8005-8012.

Takasu, Y., et al., "Oxygen Reduction Characteristics of Several Valve Metal Oxide Electrodes in HCLO$_4$ Solution", *Electrochimica Acta*, vol. 55 (2010), pp. 8220-8229.

Wieckowski, A., et al. (Editors), "Catalysis and Electrocatalysis at Nanoparticle Surfaces", *Nanomaterials as Precursors for Electrocatalysts*, (2003), Marcel Dekker, Inc., CRC Press, ISBN: 9780824708795, pp. 347 and 384-385.

Fuel Cell Technical Team, U.S. Drive Partnership, "Cell Component Accelerated Stress Test and Polarization Curve Protocols for Polymer Electrolyte Membrane Fuel Cells" (Electrocatalysts, Supports, Membranes, and Membrane Electrode Assemblies, (Revised Dec. 16, 2010), pp. 1-8.

Wagner, F.T., et al., "What Performance would Non-Pt Cathode Catalysts Need to Achieve to be Practical for Transportation? Or the Importance of A/cm$^3$", *Fuel Cell Activities*, DOE Workshop on Non-Platinum Electrocatalysts, General Motors, (Mar. 21-22, 2003), New Orleans, LA.

Fuel Cell Handbook, (Seventh Edition), by EG&G Technical Services, Inc., U.S. Department of Energy, Office of Fossil Energy, Morgantown, WV (Nov. 2004).

Adzic, R., et al., "Metal and Metal Oxide-Supported Platinum Monolayer Electrocatalysts for Oxygen Reduction", Brookhaven National Laboratory, Upton, NY, FY 2013 Annual Progress Report, DOE Hydrogen and Fuel Cells Program, Dec. 2013.

Chattopadhyay, J., et al., "Performance of Tin Doped Titania Hollow Spheres as Electrocatalysts for Hydrogen and Oxygen Production in Water Electrolysis", *International Journal of Hydrogen Energy*, vol. 33 (2008), pp. 3270-3280.

Kwak, B.S., et al., "Hydrogen Production from Ethanol Steam Reforming over Core-Shell Structured Ni$_x$O$_y$-, Fe$_x$O$_y$-, and CO$_x$O$_y$—Pd Catalysts", *International Journal of Hydrogen Energy*, vol. 35 (2010), pp. 11829-11843.

Yang, X., et al., "Carbon-Supported Ni$_{1-x}$@Pt$_x$, (x = 0.32, 0.43, 0.60, 0.67, and 0.80) Core-Shell Nanoparticles as Catalysts for Hydrogen Generation from Hydrolysis of Ammonia Borane", *International Journal of Hydrogen Energy*, vol. 36 (2011), pp. 1984-1990.

Kim, J.Y., et al., "A Novel Non-Platinum Group Electrocatalyst for PEM Fuel Cell Application", *International Journal of Hydrogen Energy*, vol. 36 (2011), pp. 4557-4564.

Vasić, D.D., et al., "DFT Study of Platinum and Palladium Overlayers on Tungsten Carbide: Structure and Electrocatalytic Activity Toward Hydrogen Oxidation/Evolution Reaction", *International Journal of Hydrogen Energy*, vol. 38 (2013), pp. 5009-5018.

Guillén-Villafuerte, O, et al., "Preliminary Studies of the Electrochemical Performance of Pt/X@MoO$_3$/C (X = Mo$_2$C, MoO$_2$, Mo$^0$) Catalysts for the Anode of a DMFC: Influence of the Pt Loading and Mo-phase", *International Journal of Hydrogen Energy*, vol. 38 (2013), pp. 7811-7821.

Reyes-Rodriguez, J.L., et al., "RRDE Study on Co@Pt/C Core-Shell Nanocatalysts for the Oxygen Reduction Reaction", *International Journal of Hydrogen Energy*, vol. 38 (2013), pp. 12634-12639.

Wang, R., et al, "Heterostructure Core PdSn—SnO$_2$ Decorated by Pt as Efficient Electrocatalysts for Ethanol Oxidation", *International Journal of Hydrogen Energy*, vol. 38 (2013), pp. 13604-13610.

Sánchez-Padilla, N.M., et al., "Fast Synthesis and Electrocatalytic Activity of M@Pt (M—Ru, Fe$_3$O$_4$, Pd) Core-Shell Nanostructures for the Oxidation of Ethanol and Methanol", *International Journal of Hydrogen Energy*, (Nov. 3, 2012), http://dx.doi.org/10.1016/j.ijhydene.2012.11.026.

Choi, I., et al., "Synthesis of an Active and Stable Pt$_{shell}$-Pd$_{core}$/C Catalyst for the Electro-Oxidation of Methanol", *International Journal of Hydrogen Energy*, vol. 39 (2014), pp. 3681-3689.

Matin, MD. A., et al. "One-Pot Sonication-Assisted Polyol Synthesis of Trimetallic Core-shell (Pd, Co)@Pt Nanoparticles for Enhanced Electrocatalysis", *International Journal of Hydrogen Energy*, vol. 39 (2014), pp. 3710-3718.

Sun, X., et al., "Core/Shell Au/CuPt Nanoparticles and Their Dual Electrocatalysis for Both Reduction and Oxidation Reactions", *Journal of the American Chemical Society*, vol. 136 (2014), pp. 5745-5749.

Ahluwalia, R.K., et al., "Dynamics of Particle Growth and Electrochemical Surface Area Loss due to Platinum Dissolution", *Journal of the Electrochemical Society*, vol. 161, No. 3 (2014), pp. F291-F304.

Rezaei, M., et al. "Electrochemical Nucleation and Growth of Pd/PdCo Core-Shell Nanoparticles with Enhanced Activity and Durability as Fuel Cell Catalyst", *Journals of Materials Chemistry A*, vol. 2 (2014), pp. 4588-4597.

(56) References Cited

OTHER PUBLICATIONS

Chen, S., et al., "Electrocatalysis under Conditions of High Mass Transport Rate: Oxygen Reduction on Single Submicrometer-Sized Pt Particles Supported on Carbon", *J. Phys. Chem. B*, vol. 108 (2004), pp. 3262-3276.

Zhang, J., et al., "Platinum Monolayer Electrocatalysts for $O_2$ Reduction: Pt Monolayer on Pd(111) and on Carbon-Supported Pd Nanoparticles", *J. Phys. Chem. B*, vol. 108 (2004), pp. 10955-10964.

Norskov, J.K., et al., "Origin of the Overpotential for Oxygen Reduction at a Fuel-Cell Cathode", *J. Phys. Chem. B*, vol. 108, (2004), pp. 17886-17892.

Zhang, J., et al., "Platinum Monolayer on Nonnoble Metal-Noble Metal Core-Shell Nanoparticle Electrocatalysts for $O_2$ Reduction", *J. Phys. Chem. B*, vol. 109, (2005), pp. 22701-22704.

Couselo, N., et al., "Tungsten-Doped $TiO_2$ vs Pure $TiO_2$ Photocatalysts: Effects on Photobleaching Kinetics and Mechanism", *J. Phys. Chem. C*, vol. 112 (2008), pp. 1094-1100.

Rinaldo, S.G., et al., "Physical Theory of Platinum Nanoparticle Dissolution in Polymer Electrolyte Fuel Cells", *J. Phys. Chem. C*, vol. 114 (2010), pp. 5773-5785.

Wang, X-L., et al., "$Sn/SnO_x$ Core-Shell Nanospheres: Synthesis, Anode Performance in Li Ion Batteries, and Superconductivity", *J. Phys. Chem. C.*, vol. 114 (2010), pp. 14697-14703.

Qi, D., et al., "Development of Core-Shell Structure $Fe_3O_4@Ta_2O_5$ Microspheres for Selective Enrichment of Phosphopeptides for Mass Spectrometry Analysis", *Journal of Chromatography A*, vol. 1216 (2009), pp. 5533-5539.

Wang, C-H., et al., "Iridium-Decorated Palladium-Platinum Core-Shell Catalysts for Oxygen Reduction Reaction in Proton Exchange Membrane Fuel Cell", *Journal of Colloid and Interface Science*, vol. 427 (2014), pp. 91-97.

Kokkinidis, G., et al, "Electroless Deposition of Pt on Ti. Part II. Catalytic Activity for Oxygen Reduction", *Journal of Electroanalytical Chemistry*, vol. 511 (2001), pp. 20-30.

Yeung, C.M.Y., et al., "Some Optimization in Preparing Core-Shell Pt-ceria Catalysts for Water Gas Shift Reaction", *Journal of Molecular Catalysis A: Chemical*, vol. 322 (2010), pp. 17-25.

Klaiber, T., "Fuel Cells for Transport: Can the Promise be Fulfilled? Technical Requirements and Demands from Customers", *Journal of Power Sources*, vol. 61 (1996), pp. 61-69.

Oh, T., et al., "Effects of Tungsten Oxide Addition on the Electrochemical Performance of Nanoscale Tantalum Oxide-Based Electrocatalysts for Proton Exchange Membrane (PEM) Fuel Cells", *Journal of Power Sources*, vol. 196 (2011), pp. 6099-6103.

Liu, Y-T., et al., "Electrochemical Activity and Stability of Core-Shell $Fe_2O_3$/Pt Nanoparticles for Methanol Oxidation", *Journal of Power Sources*, vol. 243 (2013), pp. 622-629.

Dang, D., et al., "A Pulse Electrochemical Deposition Method to Prepare Membrane Electrode Assemblies with Ultra-Low Anode Pt Loadings Through in situ Construction of Active Core-Shell Nanoparticles on an Electrode", *Journal of Power Sources*, vol. 260 (2014), pp. 27-33.

Koh, J-H., et al., "Design and Synthesis of Degradation-Resistant Core-Shell Catalysts for Proton Exchange Membrane Fuel Cells", *Journal of Power Sources*, vol. 261 (2014), pp. 271-277.

Rao, C.R.K., et al., "Electroless Deposition of Platinum on Titanium Substrates", *Materials Chemistry and Physics*, vol. 68 (2001), pp. 62-65.

Kim, D-Y., et al., "Core-Shell Nanostructure Supported Pt Catalyst with Improved Electrocatalytic Stability in Oxygen Reduction Reaction", *Materials Chemistry and Physics*, vol. 137 (2013), pp. 704-708.

Yang, H., et al., "Synthesis and Characterization of Tungsten Oxide-Doped Titania Nanocrystallites", *Materials Letters*, vol. 57 (2002), pp. 674-678.

Beard, K.D., et al., "Preparation and Structural Analysis of Carbon-Supported Co Core/Pt Shell Electrocatalysts Using Electroless Deposition Methods", *Nano*, vol. 3, No. 9 (2009), pp. 2841-2853.

Zheng, F., et al., "Facile Design of Au@Pt Core-Shell Nanostructures: Formation of Pt Submonolayers with Tunable Coverage and their Applications in Electrocatalysis", *Nano Research*, vol. 7, No. 3 (2014), pp. 410-417.

Li, G., et al., "Noble Metal Nanoparticle@metal Oxide Core/Yolk-Shell Nanostructures as Catalysts: Recent Progress and Perspective", *Nanoscale*, vol. 6, (2014), pp. 3995-4011.

Hsieh, Y-C., et al., "Ordered Bilayer Ruthenium-Platinum Core-Shell Nanoparticles as Carbon Monoxide-Tolerant Fuel Cell Catalysts", *Nature Communications*, published Sep. 18, 2013, DOI: 10.1038/ncomms3466.

Debe, M.K., "Electrocatalyst Approaches and Challenges for Automotive Fuel Cells", *Nature*, vol. 486 (Jun. 7, 2012), pp. 43-51.

Hwang, S.J., et al., "Supported Core@Shell Electrocatalysts for Fuel Cells: Close Encounter with Reality", www.nature.com/ScientificReports, published Feb. 19, 2013, DOI: 10.1038/srep01309.

Jang, J-H., et al., "Rational Synthesis of Core-Shell Fex@Pt Nanoparticles for the Study of Electrocatalytic Oxygen Reduction Reaction", www.nature.com/ScientificReports, published Oct. 7, 2013, DOI:10.1038/srep02872.

Antoniadou, M, et al., "A Photoactiviated Fuel Cell Used as an Apparatus that Consumes Organic Wastes to Produce Activity", vol. 10 (2011), pp. 431-435. $6^{th}$ European Meeting on Solar Chemistry and Photocatalysis: Environmental Applications, Issue 3 (2011) *Photochemical & Photobiological Sciences*.

Schneider, A., et al., "Transport Effects in the Oxygen Reduction Reaction on Nanostructured, Planar Glassy Carbon Supported Pt/GC Model Electrodes", *Physical Chemistry Chemical Physics*, vol. 10 (2008), pp. 1931-1943.

Katsounaros, I., et al., "Hydrogen Peroxide Electrochemistry on Platinum: Towards Understanding the Oxygen Reduction Reaction Mechanism", *Phys. Chem. Chem. Phys.*, vol. 14 (2012), pp. 7384-7391.

An, J., et al., "Ultra-Thin Platinum Catalytic Electrodes Fabricated by Atomic Layer Deposition", *Phys. Chem. Chem. Phys.*, vol. 15 (2013), pp. 7520-7525.

"Surface Area of Platinum Catalysts: Determination of Metal Particle Size", *Platinum Metals Rev.*, vol. 4, No. 3 (1960), pp. 92-93.

DOE Hydrogen Program, FY 2010 Annual Progress Report, "V.E.5 Advanced Cathode Catalysts", pp. 816-824 (Feb. 2011).

Adzic, R.R., et al., "Platinum Monolayer Fuel Cell Electrocatalysts", *Top Catal.*, vol. 46 (2007), pp. 249-262.

Abadias, G., et al., "Structural and Photoelectrochemical Properties of $Ti_{1-x}W_xO_2$ Thin Films Deposited by Magnetron Sputtering", *Surface and Coatings Technology*, vol. 205 (Jul. 1, 2011), pp. S265-S270.

Akurati, K.K., et al., "Flame-made $WO_3/TiO_2$ Nanoparticles: Relation Between Surface Acidity, Structure and Photocatalytic Activity", *Applied Catalysis B: Environmental*, vol. 79 (2008), pp. 53-62.

Batzill, M., et al., "The Surface and Materials Science of Tin Oxide", 20 Progress in Surface Science, vol. 79, No. 2-4, (2005), pp. 47-154.

Bing, Y., et al., "Nanostructured Pt-alloy Electrocatalysts for PEM Fuel Cell Oxygen Reduction Reaction", *Chemical Society Reviews*, vol. 39 (2010), pp. 2184-2202.

Carotta, et al., "(Ti, Sn)O2 Solid Solutions for Gas Sensing: A System Approach by Different Techniques for Different Calcination Temperature and Molar Composition", *Sensors and Actuators B: Chemical*, vol. 139, No. 2 (Jun. 1, 2009), pp. 329-339.

Chen, D., et al., "W-doped Anatase TiO2 Transparent Conductive Oxide Films: Theory and Experiment", *Journal of Applied Physics*, vol. 107, No. 6, (Mar. 19, 2010), p. 63707.

Chhina, H., et al., "Ex Situ and In Situ Stability of Platinum Supported on Niobium-Doped Titania for PEMFCs", *Journal of the Electrochemical Society*, vol. 156, No. 10, (2009), pp. B1232-B1237.

Chhina, H., et al., "Transmission Electron Microscope Observation of Pt Deposited on Nb-Doped Titania", *Electrochemical and Solid-State Letters*, vol. 12, No. 6 (2009), pp. B97-B100.

Chhina, H., et al., "Characterization of Nb and W Doped Titania as Catalyst Supports for Proton Exchange Membrane Fuel Cells",

(56) References Cited

OTHER PUBLICATIONS

*Journal of New Materials for Electrochemical Systems*, Ecole Polytechnique de Montreal, vol. 12, No. 4, (Oct. 1, 2009), pp. 177-185. XP001550326.
Do, T.B., et al., "Niobium-Doped Titanium Oxide for Fuel Cell Application", *Electrochimica Acta*, vol. 55, No. 27 (2010), pp. 8013-8017.
Hayden, B.E., et al., "The Influence of Pt Particle Size on the Surface Oxidation Oftitanium Dioxide Supported Platinum", *Physical Chemistry Chemical Physics*, vol. 11, No. 10 (2009), pp. 1564-1570.
Huang, S-Y., et al., "Electrocatalytic Activity and Stability of Niobium-Doped Titanium Oxide Supported Platinum Catalyst for Polymer Electrolyte Membrane Fuel Cells", *Applied Catalysis B., Environmental*, vol. 96, No. 1-2 (2010), pp. 224-231.
International Centre for Diffraction Data Database, No. 41-1445 (2010).
Lin, Q., et al., "Hydrogenation of Pyrene Using Pd Catalysts Supported on Tungstated Metal Oxides", *Applied Catalysis A: General*, vol. 387 (2010), pp. 166-172.
Nagaveni, K., et al., "Structure and Photocatalytic Activity of $Ti_{1-x}M_xO_{2\pm\delta}$ (M = W, V, Ce, Zr, Fe, and Cu) Synthesized by Solution Combustion Method", *J. Phys. Chem B*, vol. 108 (Dec. 1, 2004), pp. 20204-20212.
Subban, C.V., et al., "Sol-Gel Synthesis, Electrochemical Characterization, and Stability Testing of $Ti_{0.7}W_{0.3}O_2$ Nanoparticles for Catalyst Support Applications in Proton-Exchange Membrane Fuel Cells", *J. Am. Chem. Soc.*, vol. 132, No. 49 (Dec. 15, 2010), pp. 17531-17536.
Subban, C.V., et al., "Sol-Gel Synthesis, Electrochemical Characterisation, and Stability Testing of $Ti_{0.7}W_{0.3}O_2$ Nanoparticles for catalyst support applicationsin proton-exchange membrane fuel cells", supporting information Nov. 19, 2010, retrieved from url:http://pubs.acs.org/doi/suppl/10.1021/ja1074163/suppl_file/ja1074163_si_001.pdf [retrieved on Mar. 27, 2014].
Taylor, M.N., et al., "Synergy Between Tungsten and Palladium Supported on Titania for the Catalytic Total Oxidation of Propane", *Journal of Catalysis*, vol. 285 (2012), pp. 103-114.
Wang, Y-J, et al., "Noncarbon Support Materials for Polymer Electrolyte Membrane Fuel Cell Electrocatalysts", Chemical Reviews, vol. 111, No. 12 (Dec. 14, 2001), pp. 7625-7651. XP055111689.
Jiang, L., et al., "Highly Active Core-Shell $PtSnO_x$ Nanocatalyst: Synthesis, Characterization and Performance as Anode Catalysts for Direct Alcohol Fuel Cell", North American Catalysis Society 20th North American Meeting, Houston, TX, Jun. 18, 2007.
Wieckowski, et al., (editors), *Catalysis and Electrocatalysis at nanoparticle Surfaces*, Marcel Dekker, Inc., CRC Press (2009), "Physical and Electrochemical Characterization of Bimetallic Nanoparticle Electrocatalysts", by Markovic, et al., pp. 312-313.

\* cited by examiner

COMPOSITE MATERIALS

COMPOSITE MATERIALS

This application is a national stage application of International Application No. PCT/GB2014/050120, filed Jan. 16, 2014, which claims the benefit of United Kingdom Application No.1300822.2, filed Jan. 16, 2013.

The present invention relates to materials for use in a fuel cell and particularly to core-shell composite materials for use in a fuel cell.

A fuel cell comprises an anode for oxidation of a fuel and a cathode where an oxidising agent, such as oxygen, is reduced. Ions are transported between the two electrodes by means of an electrolyte. Fuel supplied to the cell is oxidised at the anode, releasing electrons, which pass through an external circuit to the cathode, where they are consumed during reduction of the oxidising species. In a polymer electrolyte membrane fuel cell (PEMFC), the fuel is usually hydrogen and the oxidising species is usually oxygen. A polymer electrolyte allows protons to flow from the anode to the cathode.

Platinum-containing catalysts are one of the most efficient catalysts for facilitating the oxygen reduction reaction (ORR) at the cathode of a fuel cell. Platinum, however, is a costly material and so methods for reducing the quantity of platinum required for an effective fuel cell are highly sought-after. Traditionally, platinum is dispersed over a carbon support to increase the surface area of the platinum, relative to its mass. A maximum in mass activity is produced with a platinum particle size of approximately 3-4 nm [References 1-4]. In this system, if the particle size of platinum is further reduced, oxygen reduction activity is also sharply reduced, limiting the advantages that can be achieved by dispersion. An additional disadvantage with the system is that the carbon support can become oxidised under fuel cell operating conditions. This oxidation leads to degradation of the catalyst, which limits the lifetime of the fuel cell [5].

Metal oxides have previously been investigated for use as fuel cell catalyst supports [6-18]. Metal oxides are less prone to oxidative corrosion than carbon, and can, therefore, be more stable in a fuel cell environment. The use of metal oxides as supports for fuel cell catalysts and methods of synthesising suitable oxides has been described in, for example, US2009/0065738A1, US2006/0263675, U.S. Pat. No. 7,704,918B2, US2007/0037041A1, WO2008/025751 and WO2009/152003 [14-18].

Core-shell catalysts with Pt as the shell material are reported in the literature [17-28]. A core-shell structure is represented schematically in FIG. 1. Many of the systems described in the literature contain a precious metal core, such as Au or Pd [19-22, 24-26, 28]. Consequently, although there is a potential reduction in the quantity of platinum required to produce an effective catalyst, use of another expensive metal within the core, keeps costs high. Other reported core materials include base metals (Cu [27], for example), which are more cost-effective than platinum, but likely to be unstable in a fuel cell. Adzic et al [17, 18] disclose a core-shell type structure with a $NaWO_3$ core. WO2008/025751 [29] discloses a Pt-coated zirconia and cerium-doped zirconia core-shell system.

The present inventors have investigated the use of metal oxides as supports for fuel cell catalysts and have developed a particularly effective core-shell material.

The present invention is based upon the determination that a mixed oxide of titanium and tantalum can be used as a core supporting material and that a critical thickness of platinum applied as a shell can provide bulk platinum-like oxygen reduction behaviour. The critical thickness is thought to be achieved when platinum particles coalesce to form layers, i.e., as a shell.

In its broadest aspect, the present invention provides a mixed metal oxide material of titanium and tantalum.

Preferably, the mixed metal oxide material comprises between 1 and 20 atomic % titanium (on a metals basis, i.e. excluding oxygen).

More preferably, the mixed metal oxide material comprises between 1.3 and 15.8 atomic % titanium.

Suitably, the mixed metal oxide comprises tantalum oxide doped with titanium.

In another aspect of the present invention, there is provided a catalyst support comprising a mixed metal oxide material as described above.

Suitably, the mixed metal oxide material can be used as a support for platinum particles. To achieve similar oxygen reduction activity to that achieved with use of bulk platinum, the platinum is coalesced to form a film or homogenous layer.

A further aspect of the present invention provides a catalytic medium comprising a mixed metal oxide material as described above and a catalyst applied to a surface of the mixed metal oxide material.

Preferably, the catalyst is applied as a catalytic layer to the mixed metal oxide material.

In a preferred embodiment, the mixed metal oxide material is formed as a core particle.

Preferably, the core particle has a diameter of 10-50 nm, more preferably 10-25 nm.

Preferably, the catalyst is applied as a shell on the core particle.

Alternatively, the mixed metal oxide material is formed as a layer structure.

Suitably, the catalyst comprises platinum or platinum alloy.

Preferably, the catalyst comprises 1-20 ML (monolayers) of platinum or platinum alloy.

In one embodiment, the tantalum oxide is amorphous, the catalyst comprises at least approximately 4.6 ML of platinum or platinum alloy. More preferably, the catalyst comprises at least between approximately 6.5 and approximately 9.3 ML of platinum or platinum alloy.

According to a further aspect of the present invention, there is provided a method of producing a catalytic medium, the method comprising: forming a mixed metal oxide material as described above; and forming a catalytic layer comprising at least one monolayer of catalyst on the mixed metal oxide material.

In one embodiment, the method comprises forming a catalytic layer of 1 to 20 ML platinum or platinum alloy, preferably at least about 4.6 ML.

Preferably, the method comprises forming a catalytic layer of between approximately 6.5 and approximately 9.3 ML of platinum or platinum alloy.

Another aspect of the present invention provides a catalyst for a fuel cell comprising a mixed metal oxide material as described above.

A further aspect of the present invention provides a fuel cell comprising a catalytic medium as described above.

In a yet further aspect of the present invention, there is provided use of a mixed metal oxide material as described above or a catalytic medium as described above in a fuel cell.

The term monolayer (ML) as used herein is used to mean the equivalent amount of catalytic material which would form a uniform layer of 1 atom thickness on a flat surface. It will be appreciated that, in practice, a surface of the mixed metal oxide is unlikely to be perfectly automatically flat. Accordingly, it will be understood that a 1 ML layer of catalyst on the mixed metal oxide substrate will have areas where there are a plurality of catalyst atoms in a layer and areas where there are no atoms of catalyst.

As used herein the term mixed metal oxide indicates an oxide of a mixture of metals; a mixture of metal oxides; or a combination thereof.

Figure 9:
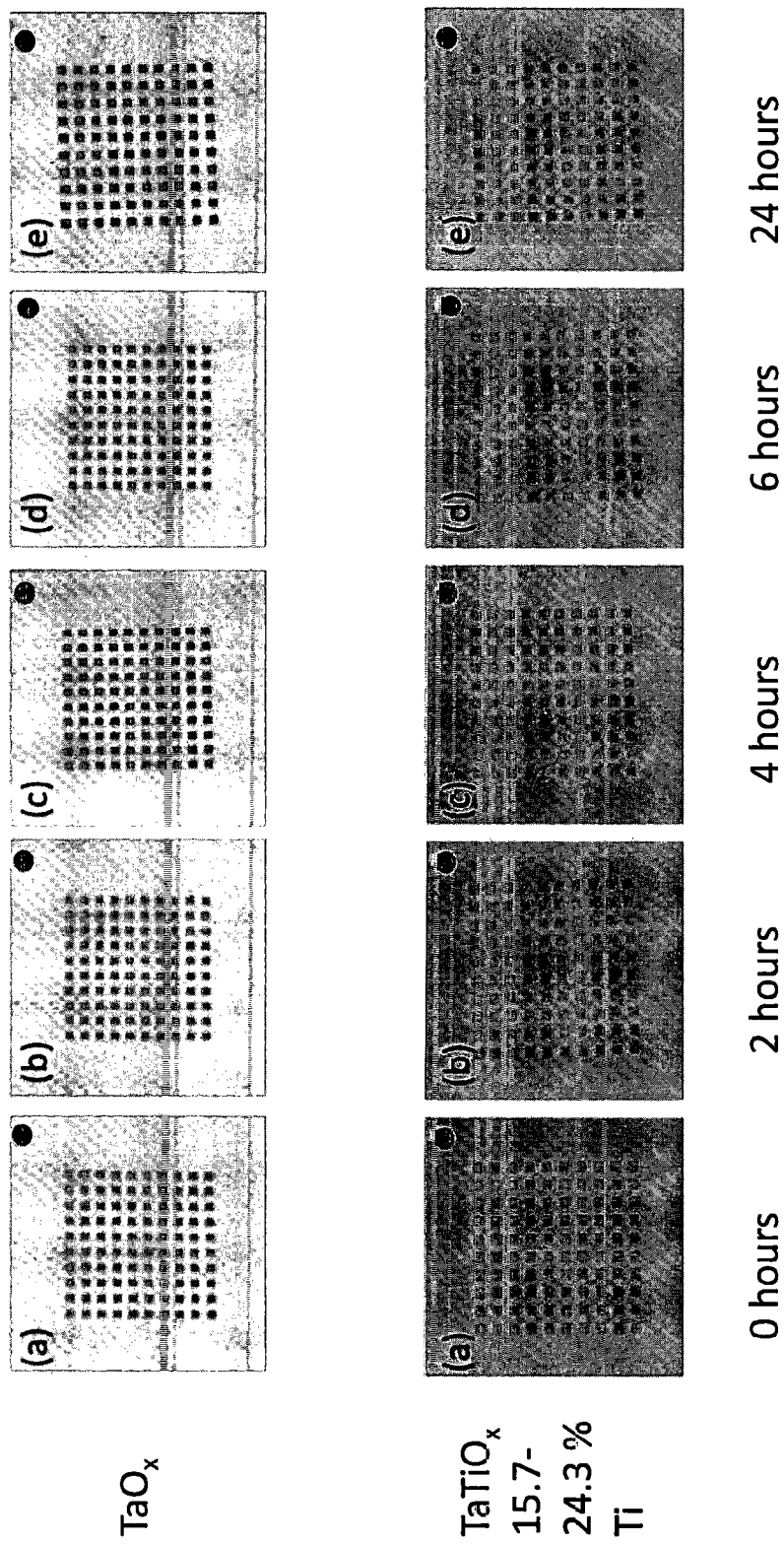
Figure 10:
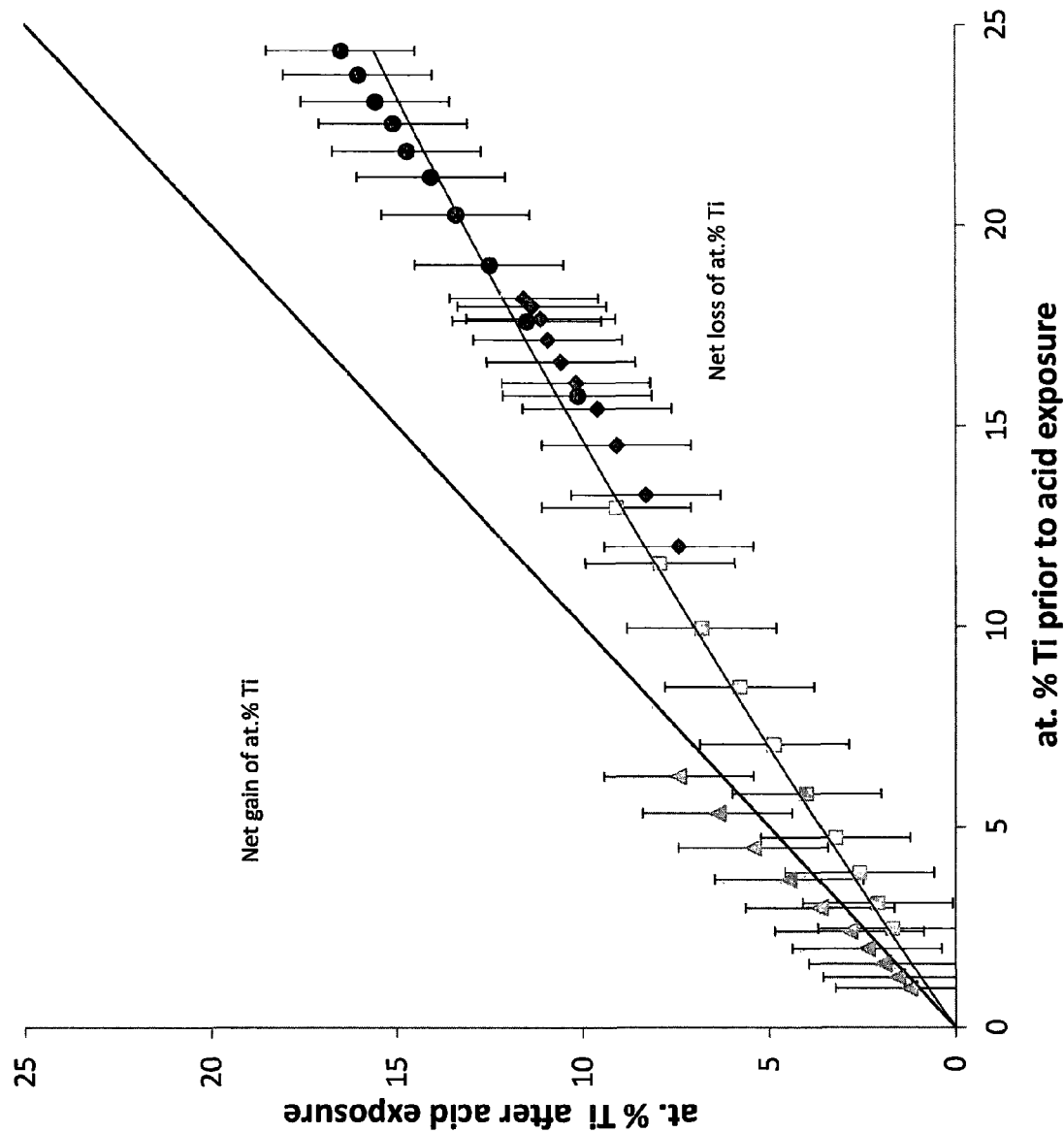

FIG. 9 is images of $TaTiO_x$ samples (deposited on silicon wafers) with varying Ti content after exposure to 0.1 M $H_2SO_4$ for 0, 2, 4, 6 and 24 hours at 80° C.; and FIG. 10 is a chart comparing of the titanium content (measured by ICP-MS) of titanium doped tantalum oxide samples deposited on silicon wafers before and after 24 hours exposure to 0.1 M $H_2SO_4$ at 80° C.

For ease of reference, mixed metal oxide materials of titanium and tantalum will be represented as $TaTiO_x$. It will be appreciated that this is not a chemical formula indicating any specific stoichiometry, but merely a shorthand indication of the elemental composition of the material. It is not to be taken as limiting the stoichiometry within the mixed metal oxide.

Thin film models of core-shell catalysts for the oxygen reduction reaction in PEM fuel cells have been synthesised with metal oxide cores and a platinum catalyst shell. Metal oxides offer a stable alternative to carbon supports (which are prone to oxidative destruction) and would therefore increase the lifetime of fuel cells.

Figure 1:
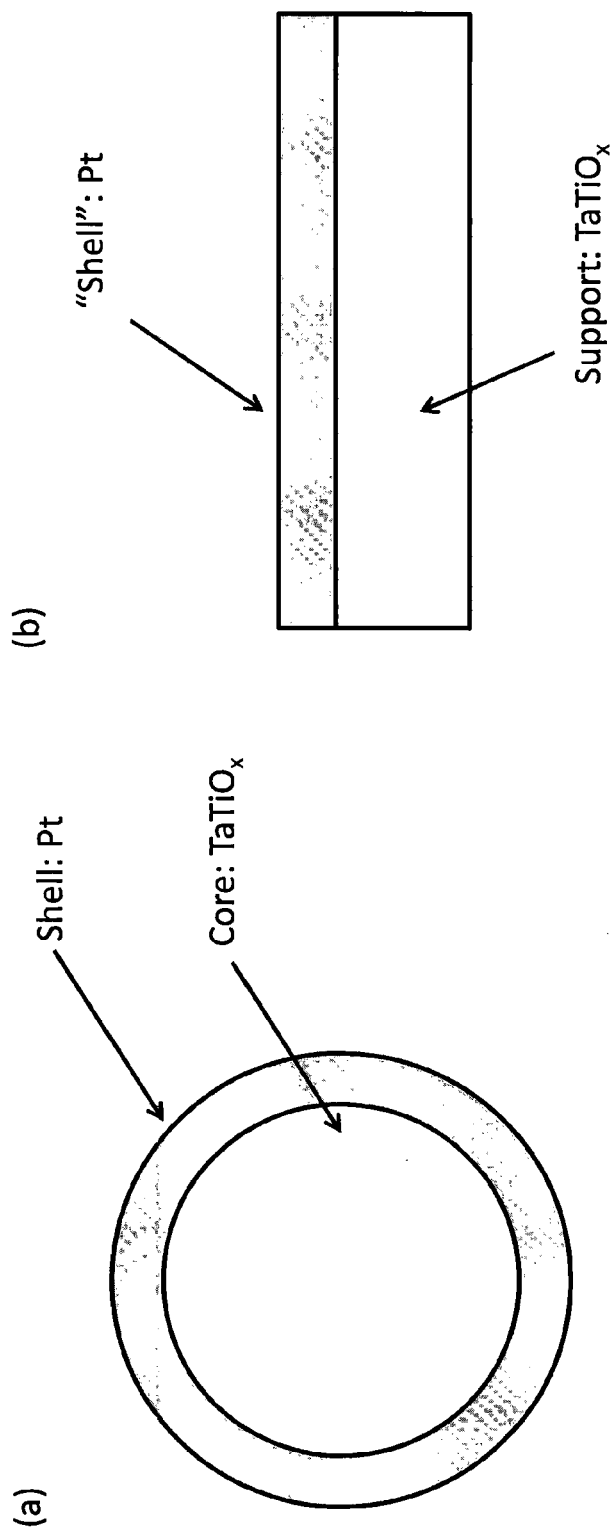
FIG. 1 is a schematic cross-section of a core-shell structure and an equivalent layer structure used to model the core shell particle behaviour.
Figure 2:
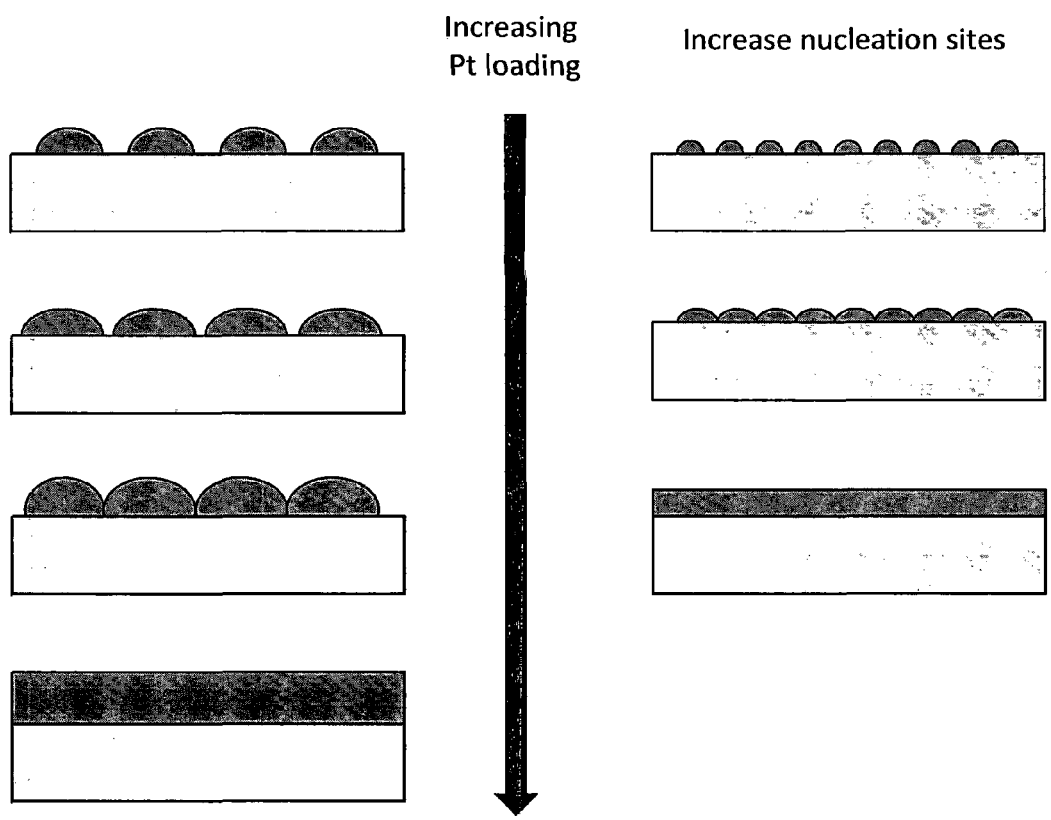
FIG. 2 is a schematic representation of platinum particle growth and nucleation.

With reference to FIG. 1, thin film models of core-shell structures have been produced. The structures have a titanium doped tantalum oxide core and platinum shell and have the same (or similar) activity for oxygen reduction as bulk platinum. Traditionally, dopants have been added to metal oxides in order to increase conductivity by creating defects (such as oxygen vacancies). However, in addition to increased conductivity, dopants may also help to create defects on the surface of metal oxides and hence more sites for nucleation of a metal overlayer. The presence of defects cause smaller particles to be formed, leading to a more complete film of metal at a lower equivalent thickness (or loading) (see FIG. 2). A film of platinum potentially has the same oxygen reduction activity as bulk platinum, since a significant number of platinum atoms will be in contact.

Titanium doped tantalum oxide has been investigated as the core supporting material and the equivalent thickness of platinum at which bulk platinum like oxygen reduction behaviour is achieved (the critical thickness $d_{crit}$) has been identified by the inventors. This appears to be when the platinum particles coalesce to form layers (i.e. a core shell structure) and is evidenced by an overpotential equivalent for the oxygen reduction reaction to that of bulk platinum. On all of the tantalum oxide based supports $d_{crit}$ was found to be between 6.5 and 9.3 ML (monolayers) equivalent thickness of platinum. Performance above this thickness was retained after stability cycling. Investigations described below showed that the support materials are visually stable under warm acidic conditions. It is postulated that, as shown on titanium oxide, mass specific activity on a Pt basis, and stability of the structures could be enhanced by crystallisation of the support (core) materials.

EXAMPLE 1

Synthesis of Samples

Figure 3:
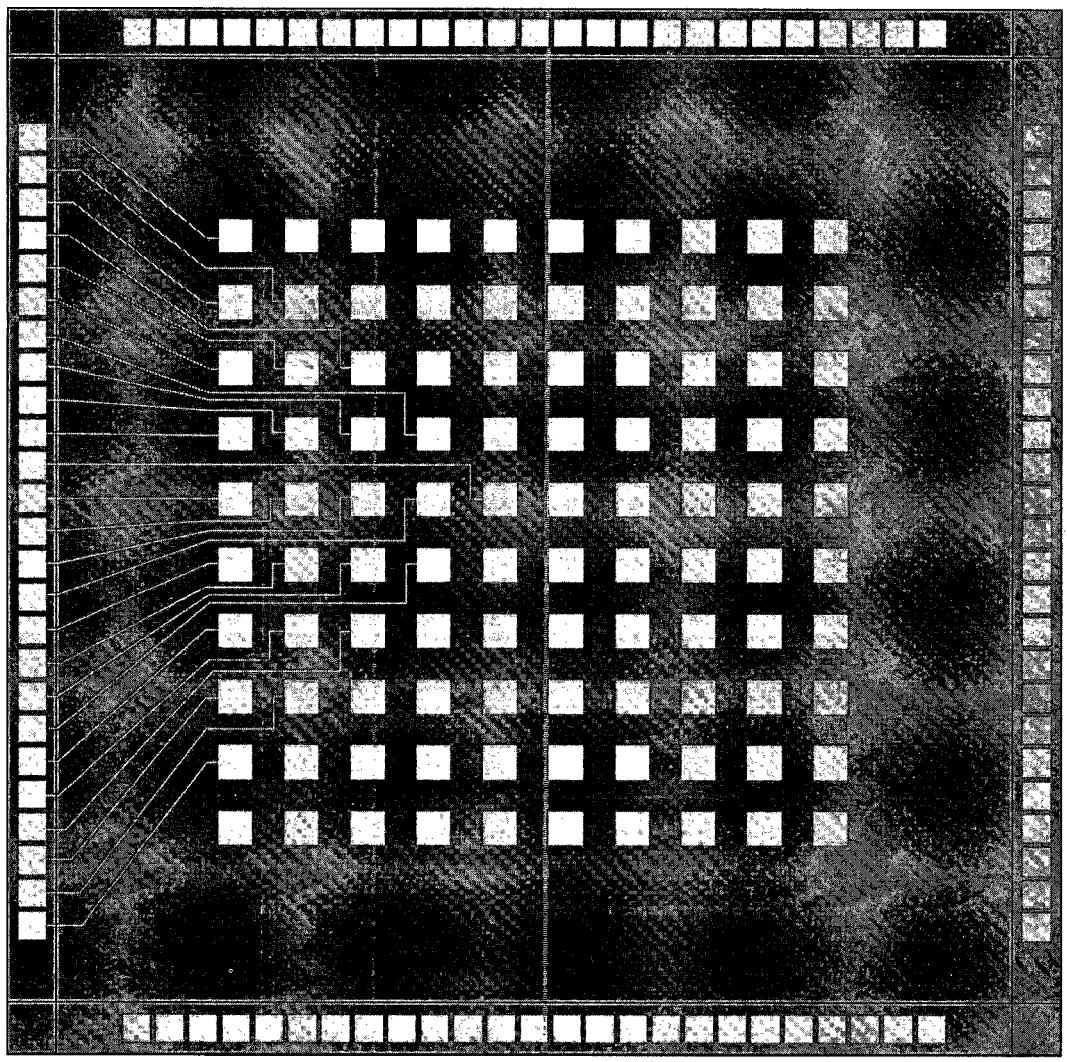
FIG. 3 is a schematic view of an electrochemical array substrate.

Thin film samples were deposited using high-throughput PVD (Physical Vapour Deposition) to model core-shell structures. This system is described in detail elsewhere [30]. A range of oxide samples were synthesised onto different substrates including silicon wafers, quartz wafers and electrochemical arrays (10×10 arrays of gold contact pads as represented in FIG. 3). Titanium and tantalum were deposited from an electron gun (E-gun) source. The $TaTiO_x$ films were deposited in the presence of an atomic oxygen source (operating at 600 W power) at a pressure of approximately 5×10$^{-6}$ Torr, which would lead to high oxygen stoichiometric materials.

The platinum was deposited onto the pre-deposited oxide thin films from an E-gun source. During deposition the oxide substrates were heated to 200° C. in order to dehydroxylate the surface. A shutter was moved during deposition to allow different equivalent thicknesses of platinum to be deposited onto different fields. These deposition procedures allowed for a varying oxide composition of the support in one direction and a varying amount of platinum in the other orthogonal direction. The amount of platinum deposited was calibrated by depositing thicker films onto silicon substrates and measuring the thickness of the films by AFM (Atomic Force Microscopy). A calibration curve against deposition time was then produced.

EXAMPLE 2

Oxide Characterisation

The composition of the oxide films was determined using a Laser Ablation Inductively Coupled Plasma Mass Spectrometer (LA-ICP-MS, New Wave 213 nm laser & Perkin Elmer Elan 9000). This method gives the relative composition of the metallic elements, but is not capable of measuring the oxygen concentration. As the ICP-MS measurements are destructive, composition measurements were made on samples deposited onto silicon wafers. The same deposition conditions were then used to deposit onto equivalent electrochemical arrays.

X-Ray diffraction (XRD) patterns were obtained using the Bruker D8 Discover diffractometer, a powerful XRD tool with a high-precision, two-circle goniometer with independent stepper motors and optical encoders for the Theta and 2 Theta circles. The D8 diffractometer system was equipped with a GADDS detector operating at 45 kV and 0.65 mA. A high intensity X-ray IμS Incoatec source (with Cu Kα radiation) was incorporated allowing high intensity and collimated X-rays to be localised on thin film materials providing an efficient high throughput structural analysis. This analysis was carried out on oxide films deposited onto Si substrates.

Stability tests were carried out on the oxide films deposited on Si substrates. The samples were immersed in 200 mL of 0.1 M $H_2SO_4$ at 80° C. for a period of 24 hours. Photographs of the samples were obtained after 0, 2, 4, 6 and 24 hours. ICP-MS was also carried out on the samples before and after this testing.

EXAMPLE 3

Electrochemical Screening

The high-throughput electrochemical screening equipment enables electrochemical experiments on 100 independently addressable electrodes arranged in a 10×10 array in a parallel screening mode which has been described in detail elsewhere [2, 31]. The geometric areas of the individual working electrodes on the electrochemical array are 1.0 $mm^2$.

The design of the cell and socket assembly provides a clean electrochemical environment with control of the temperature during experiments. In the experiments described, the temperature was maintained at 25° C. and a mercury/mercury sulphate (MMSE) reference electrode was used. The potential of the MMSE was measured vs. a hydrogen reference electrode prior to screening experiments and all potentials are quoted vs. the reversible hydrogen electrode (RHE). A Pt mesh counter electrode was used, in a glass compartment separated from the working electrode compartment by a glass frit. Various sweep rates were used for different experiments which are outlined in Table 1.

TABLE 1

Electrochemical screening procedure.

| Experiment | Gas | Potential limits/ V vs. RHE | Sweep rate/ mV $s^{-1}$ |
|---|---|---|---|
| 3 CVs in deoxygenated solution | Bubbling Ar 20 min Ar above solution | 0.025-1.200 | 100 |
| $O_2$ saturation | Bubbling Ar 60 s Bubbling $O_2$ 10 min | At 1.000 At 1.000 | |
| $O_2$ reduction steps | Bubbling $O_2$ in solution | Step from 1.00 to 0.60 and back to 1.00 in 50 mV increments every 90 s | |
| 3 CVs in $O_2$ saturated solution | $O_2$ above solution | 0.025-1.200 | 5 |
| 200 CVs stability testing | Bubbling Ar 20 min Ar above solution | 0.025-1.200 | 100 |
| 3 CVs in $O_2$ saturated solution | Bubbling with $O_2$ for 20 min $O_2$ above solution | At 1.000 0.025-1.200 | 5 |
| $O_2$ reduction steps | Bubbling $O_2$ in solution | Step from 1.00 to 0.60 and back to 1.00 in 50 mV increments every 90 s | |
| CO stripping | Bubbling CO 15 min Bubbling Ar 20 min Ar above solution | At 0.075 At 0.075 0.025-1.200 | 100 |

The electrolyte used for all experiments was 0.5 M $HClO_4$ prepared from concentrated $HClO_4$ (double distilled, GFS) and ultrapure water (ELGA, 18 MΩ cm). The gases used (Ar, $O_2$ and CO) were of the highest commercially available purity (Air Products). Unless stated otherwise, experiments were performed under an atmosphere of argon. Oxygen reduction experiments were performed under an atmosphere of $O_2$. During potential step measurements, oxygen was bubbled through the electrolyte. Unless noted otherwise, the maximum potential applied to the electrodes was 1.2 V vs. RHE. The screening procedure carried out on each array is outline in Table 1.

EXAMPLE 4

Anatase and Amorphous Un-Doped Titanium Oxide

To compare amorphous and crystalline un-doped titanium oxide (also known as titania) as a support for Pt, separate electrochemical arrays were synthesised. The deposited titanium oxide was amorphous. The titanium oxide was then crystallised by heating in a tube furnace at 450° C. for 6 hours in the presence of oxygen. XRD confirmed that the titanium oxide had been crystallised in the anatase form.

Figure 4:
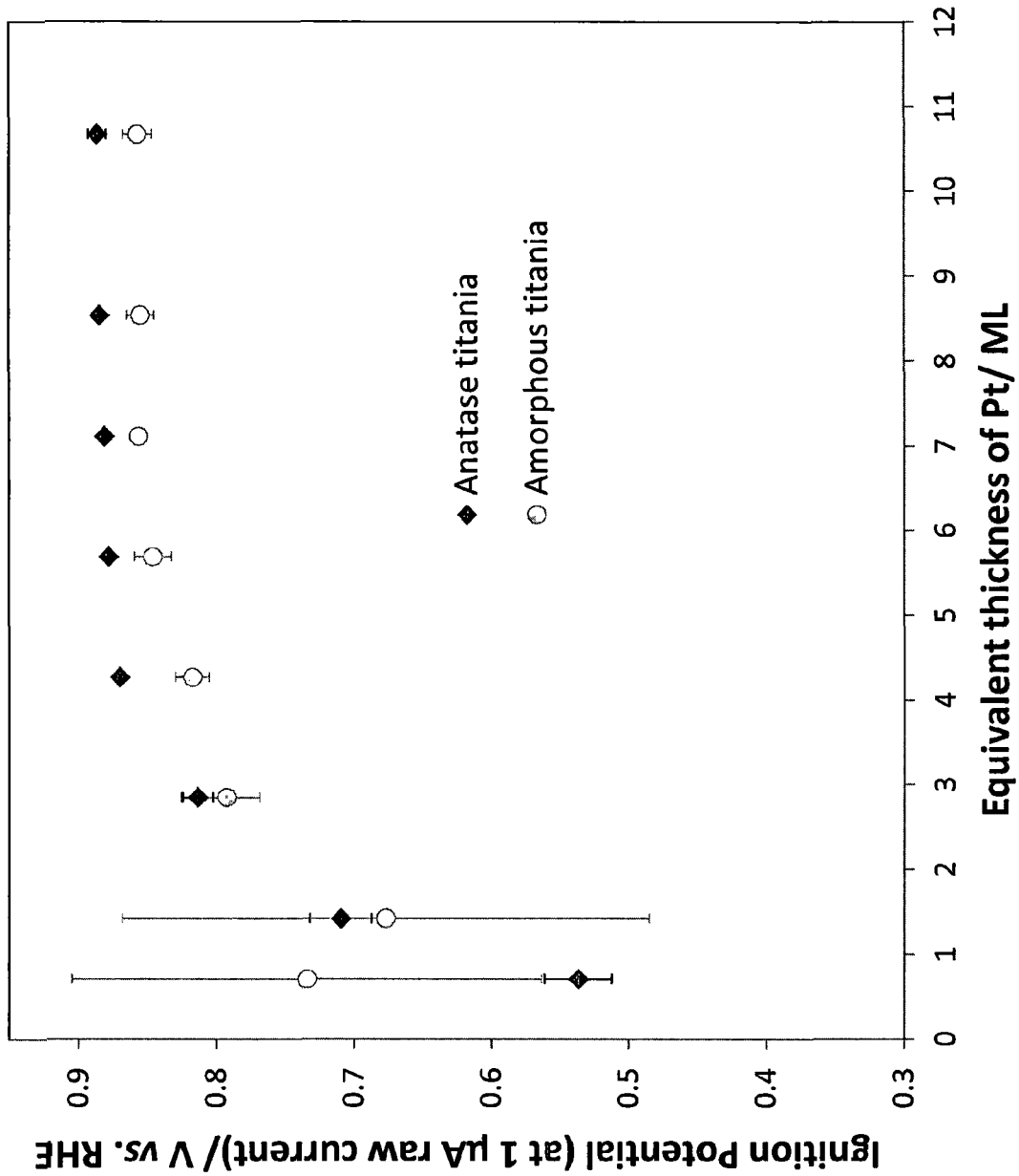
FIG. 4 is a chart showing the potential at which 1 µA raw current is reached during the oxygen reduction slow cycling experiment for Pt supported on amorphous and anatase titanium oxide (error bars are plus and minus one standard deviation)

FIG. 4 shows the potential at which 1 μA raw current is reached (threshold values used to measure the onset or ignition potential) during the oxygen reduction slow cycling experiment (i.e. cycling at 20 mV $s^{-1}$ in oxygenated 0.5 M $HClO_4$) for various equivalent thicknesses of Pt for Pt supported on amorphous and anatase titanium oxide. An ignition or onset potential is defined as the potential at which the absolute value of the current starts to increase from the background (double layer) level in a cyclic voltammetry experiment, indicating that an oxidation or reduction reaction is taking place. Average results were taken across an array row for identical Pt equivalent thicknesses. This gives a measure of the onset potential of the oxygen reduction reaction. The higher the onset potential, the more active the catalyst for the oxygen reduction reaction. It can be seen that at high equivalent thicknesses of Pt, the ignition potential remains fairly constant with decreasing equivalent thickness of Pt, and similar for both supports.

Figure 5:
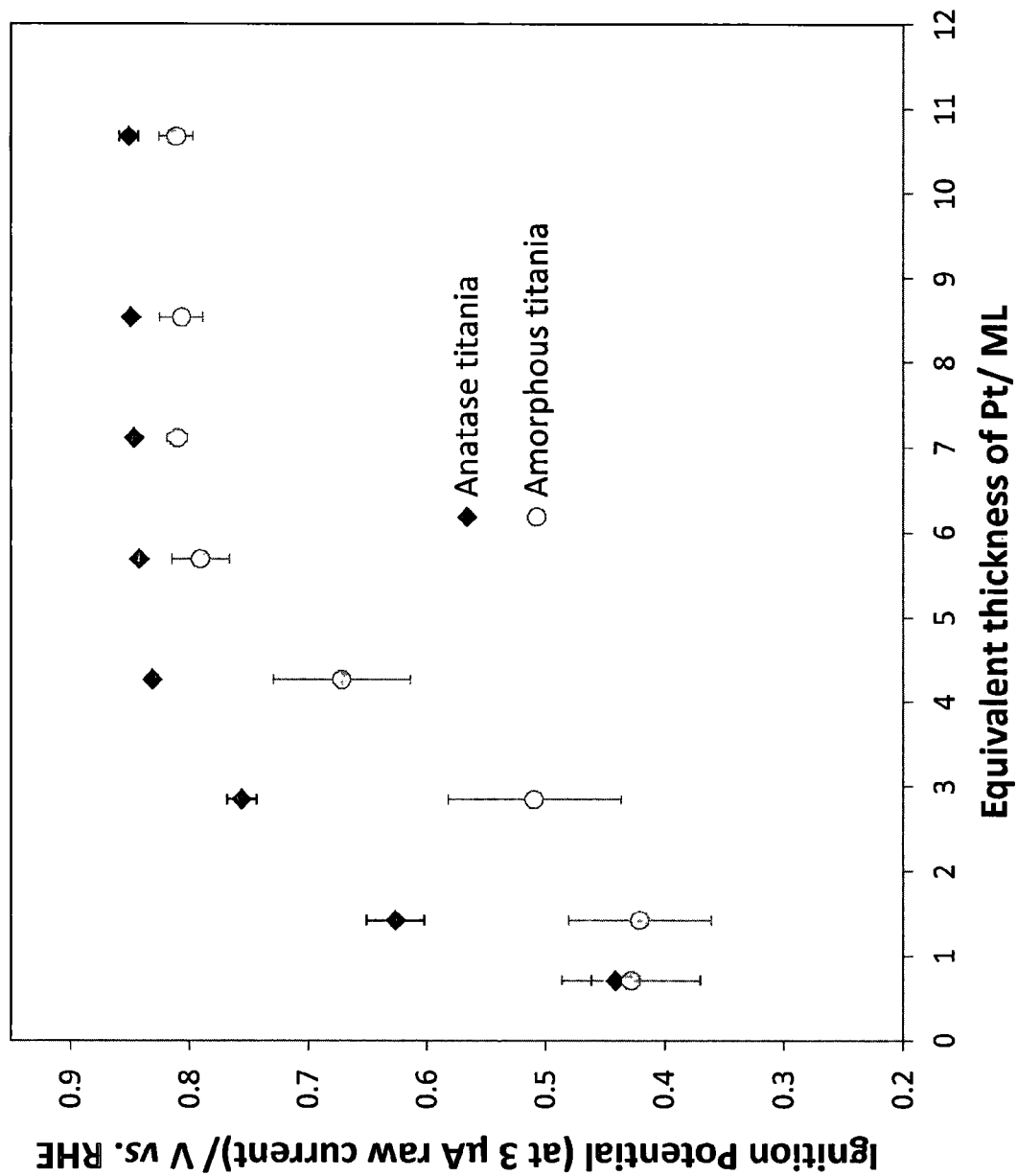
FIG. 5 is a chart showing the potential at which 3 µA raw current is reached during the oxygen reduction slow cycling experiment for amorphous and anatase titanium oxide (error bars are plus and minus one standard deviation)

However, between 5 and 6 ML (monolayers) equivalent thickness of Pt, the ignition potential starts to decrease on both support materials. The effect on the amorphous material is more significant. At 5 to 6 ML for both supports the ignition potential decreases further. On the amorphous titanium oxide at low equivalent thicknesses there is a large amount of scatter in the data. FIG. 5 shows the potential at which 3 µA raw current is reached in the oxygen reduction slow cycling experiment for the same set of data. At this current it is even clearer that the reduction wave is shifted more significantly negative on the amorphous support. This suggests that the anatase support provides better wetting for the platinum and therefore higher activity down to a lower equivalent thickness of Pt.

Figure 6:
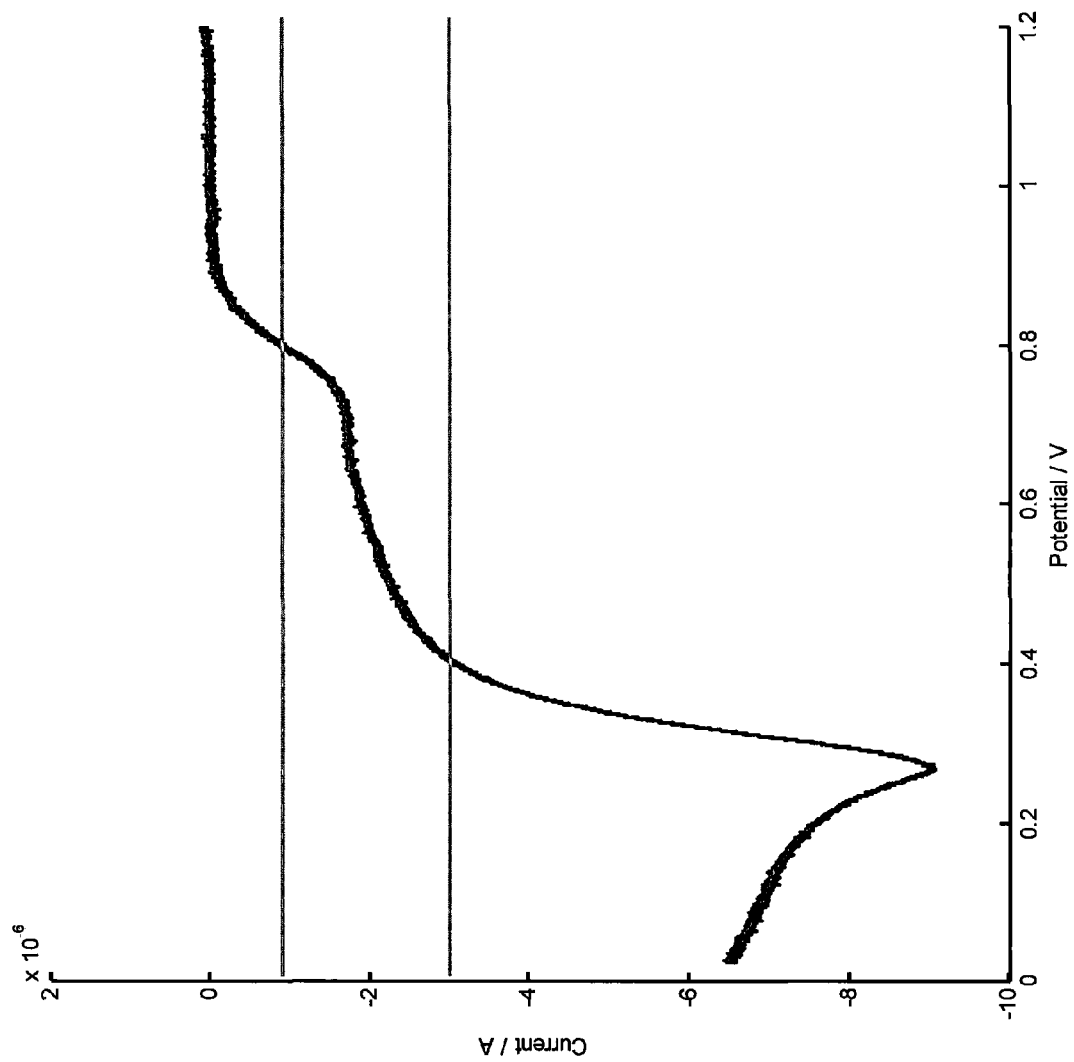
FIG. 6 is a chart showing an example $O_2$ reduction slow cycling CV for 0.7 ML of Pt supported on amorphous $TiO_x$ indicating the two different potentials where ignition potentials have been measured.

FIG. 6 shows the voltammetry for one electrode during the oxygen reduction reaction with 0.7 ML equivalent thickness of Pt supported on amorphous titanium oxide. The two currents at which ignition potentials have been measured are indicated with grey lines. Two reduction features are seen: a small feature with a high onset potential, and a larger feature with a low onset potential. These two features are probably due to inhomogeneity within the sample, i.e. some large islands of platinum leading to a high ignition potential and some smaller particles leading to the lower ignition potential. The ignition potential measured at 1 µA raw current gives an indication of the onset of the first reduction feature and the ignition potential measured at 3 µA raw current gives an indication of the onset of the second reduction feature.

These results suggest that the platinum shows slightly better wetting on the anatase titanium oxide, allowing bulk platinum like oxygen reduction activity to a lower equivalent thickness than on amorphous titanium oxide.

EXAMPLE 5

Figure 7:
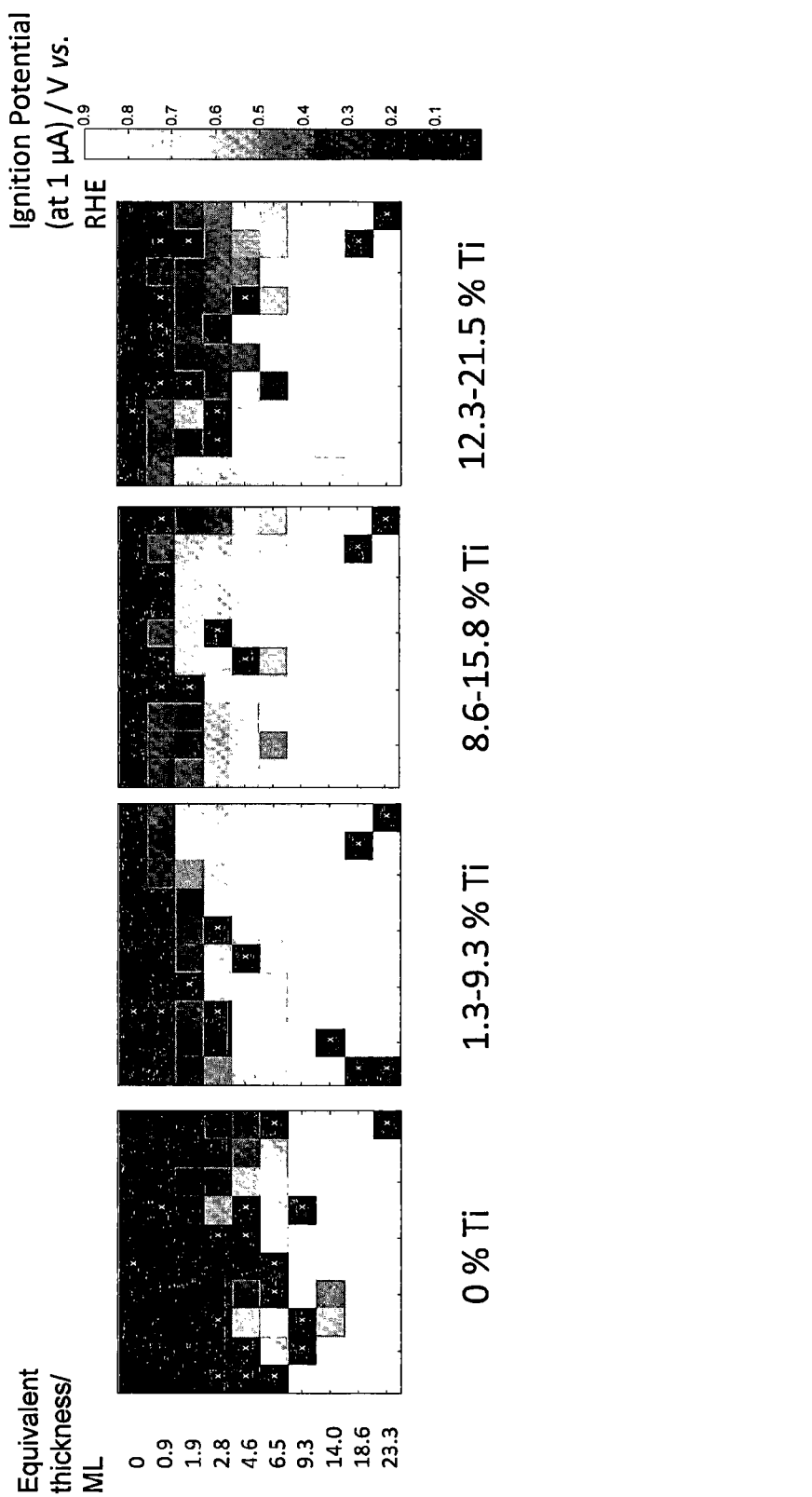
FIG. 7 shows four charts illustrating ignition potentials (the potential at which 1 µA raw current is reached) for the oxygen reduction reaction (the second negative going cycle at 20 mV s$^{-1}$ in $O_2$ saturated 0.5 M $HClO_4$) for Pt supported on titanium doped tantalum oxide (atomic percentages of titanium are shown along the bottom of the diagram) before stability cycling.

Titanium Doped Tantalum Oxide $TaTiO_x$ films deposited onto silicon wafers at room temperature were confirmed to be amorphous by XRD. Platinum was deposited onto these amorphous supports at 200° C. FIG. 7 shows the potential at which 1 µA raw current is reached (selected to represent the ignition potential) during oxygen reduction slow cycling, before stability cycling, for four different arrays with varying Ti content. Atomic percentages of Ti are shown under each figure. It can be seen that at high equivalent thicknesses of Pt (9.3-23.3 monolayers (ML)), the ignition potentials are high (~0.9 V vs. RHE) on all of the arrays. This ignition potential is similar to the average ignition potential (at the same current) achieved from an array with a platinum film deposited directly onto the gold contact pads, of 0.915 V vs. RHE.

This suggests that the thickest films deposited onto the tantalum oxide supports approach bulk platinum like behaviour. Below approximately 9.3 ML equivalent thickness, the ignition potentials decrease. This indicates that a higher overpotential is required for equivalent thicknesses below between 6.5 and 9.3 ML. The addition of Ti to the support as a dopant appears to have some effect at keeping the ignition potentials higher than on the pure tantalum oxide support when the Pt equivalent thickness is below 9.3 ML. This suggests that the Ti has some positive effect, possibly by providing additional nucleation sites for Pt particle formation and growth and hence aiding wetting. The amount of Ti dopant does not appear to have a significant effect.

Figure 8:
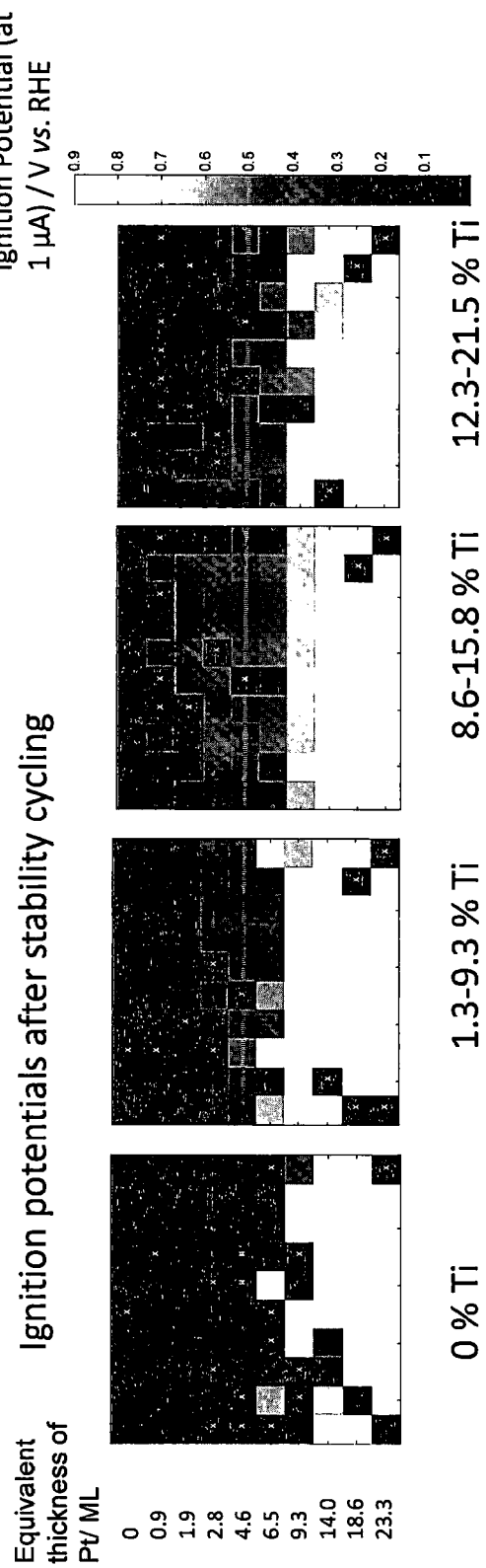
FIG. 8 shows four charts illustrating ignition potentials (the potential at which 1 µA raw current is reached) for the oxygen reduction reaction (the second negative going cycle at 20 mV s$^{-1}$ in $O_2$ saturated 0.5 M $HClO_4$) for Pt supported on titanium doped tantalum oxide (atomic percentages of titanium are shown along the bottom of the diagram) after stability cycling.

FIG. 8 shows the ignition potentials for the oxygen reduction slow cycling after 200 stability cycles (between 0.025 and 1.2 V vs. RHE at 100 mV s$^{-1}$ in Ar purged 0.5 M $HClO_4$). In general, for the electrodes with a low equivalent thickness of Pt (apart from those with little or no Pt, where the ignition potentials were low and stayed low), the ignition potentials generally decreased, i.e. the overpotential for the oxygen reduction reaction increased. On all of the arrays above 14.0 ML equivalent thickness of Pt the ignition potentials remained high and fairly constant, similar to bulk Pt-like behaviour.

There were variable ignition potentials across the arrays at the equivalent thickness of 9.3 ML of Pt suggesting that at this equivalent thickness the film starts to deviate from bulk Pt-like behaviour. There was no obvious trend in Ti content of the support material. The decrease in activity before and after stability cycling does not appear to be due to dissolution of the support material as photos of samples before and after electrochemical screening show very little difference in visual appearance.

The activity for oxygen reduction of these doped tantalum oxide systems could be increased further by crystallisation of the support since anatase titanium oxide has better activity as a support material than amorphous titanium oxide (see FIG. 4 and FIG. 5).

The amorphous $TaTiO_x$ materials deposited onto silicon wafers were tested for their stability under acidic conditions by immersing in 0.1 M $H_2SO_4$ for 24 hours. It can be seen from FIG. 9 that, up to 24.3 at. % titanium doping, the amorphous tantalum oxide appears stable under these conditions.

As indicated above, atomic percentage values given are on the total metal content. That is to say, 46.9 at % Ti indicates 53.1 at % Ta. The exact stoichiometry including oxygen atoms is undefined but is at or close to stoichiometric, thereby maintaining oxide properties.

FIG. 10 shows the titanium content of the doped tantalum oxides before and after acid testing (measured by ICP-MS). It can be seen that titanium is lost from the oxide material under these conditions after 24 hours. This is unsurprising since amorphous titanium oxide is known to be unstable under these conditions. The oxide material does not visually break down which can be attributed to the inherent stability of the tantalum oxide, even whilst amorphous. Stability of the material may be enhanced by crystallisation, which may also lead to better oxygen reduction activity at lower equivalent thicknesses of Pt.

The above experiments show that as the loading of platinum is decreased on all of the support materials studied, the ignition potential for the oxygen reduction reaction initially remains constant. However, below a certain critical thickness ($d_{crit}$) the ignition potential starts to decrease (i.e. the overpotential for the oxygen reduction reaction starts to increase, or the electrodes are less active for the oxygen reduction reaction). At high loadings of platinum, the ignition potential is similar to a bulk platinum electrode, suggesting a core-shell structure with enough Pt atoms in contact to mimic bulk metal. When the ignition potential starts to decrease, this is because the platinum starts to break into discrete particles.

On the titanium doped tantalum oxide support, the $d_{crit}$ value was between 6.5 and 9.3 ML equivalent thickness of platinum, suggesting that complete films of platinum were achieved within this range. When titanium was added to the tantalum oxide support, there was an enhancement in activity seen below the $d_{crit}$ level, suggesting better wetting of the platinum at reduced loadings.

The loading of platinum needed to achieve bulk platinum like oxygen reduction activity when the platinum is supported on an undoped titanium oxide support was reduced when moving from amorphous to anatase titanium oxide. Therefore, it can be understood that if titanium doped tantalum oxide is crystallised, this may further enhance the oxygen reduction activity. Crystallisation may also enhance the stability of the mixed metal oxide support material.

Use as a Core-Shell Catalyst

The materials described in the present application are readily scaled up from the model thin film samples to bulk core shell powder materials using known techniques. US2010/0197490, US2007/0031722, US2009/0117257, US2006/0263675 and CN101455970 give examples of suitable procedures. Other methods will be readily apparent to the skilled person.

The stability of the materials described in this application is such that the materials are effective for use in fuel cells.

References

1. Peuckert, M., et al., *Oxygen Reduction on Small Supported Platinum Particles*. Journal of The Electrochemical Society, 1986. 133(5): p. 944-947.
2. Guerin, S., et al., *Combinatorial Electrochemical Screening of Fuel Cell Electrocatalysts*. Journal of Combinatorial Chemistry, 2003. 6(1): p. 149-158.
3. Gasteiger, H. A., et al., *Activity benchmarks and requirements for Pt, Pt-alloy, and non-Pt oxygen reduction catalysts for PEMFCs*. Applied Catalysis B: Environmental, 2005. 56(1-2): p. 9-35.
4. Xu, Z., et al., *Effect of particle size on the activity and durability of the Pt/C electrocatalyst for proton exchange membrane fuel cells*. Applied Catalysis B: Environmental, 2012. 111-112(0): p. 264-270.
5. de Bruijn, F. A., V. A. T. Dam, and G. J. M. Janssen, *Review: Durability and Degradation Issues of PEM Fuel Cell Components*. Fuel Cells, 2008. 8(1): p. 3-22.
6. Huang, S.-Y., et al., *Development of a Titanium Dioxide-Supported Platinum Catalyst with Ultrahigh Stability for Polymer Electrolyte Membrane Fuel Cell Applications*. Journal of the American Chemical Society, 2009. 131(39): p. 13898-13899.
7. Hayden, B. E., et al., *The influence of support and particle size on the platinum catalysed oxygen reduction reaction*. Physical Chemistry Chemical Physics, 2009. 11(40): p. 9141-9148.
8. Huang, S.-Y., P. Ganesan, and B. N. Popov, *Electrocatalytic activity and stability of niobium-doped titanium oxide supported platinum catalyst for polymer electrolyte membrane fuel cells*. Applied Catalysis B: Environmental, 2010. 96(1-2): p. 224-231.
9. Antolini, E. and E. R. Gonzalez, *Ceramic materials as supports for low-temperature fuel cell catalysts*. Solid State Ionics, 2009. 180(9-10): p. 746-763.
10. Chen, Y., et al., *Atomic layer deposition assisted Pt—SnO2 hybrid catalysts on nitrogen-doped CNTs with enhanced electrocatalytic activities for low temperature fuel cells*. International Journal of Hydrogen Energy, 2011. 36(17): p. 11085-11092.
11. Cui, X., et al., *Graphitized mesoporous carbon supported Pt—SnO2 nanoparticles as a catalyst for methanol oxidation*. Fuel, 2010. 89(2): p. 372-377.
12. Guo, D.-J. and J.-M. You, *Highly catalytic activity of Pt electrocatalyst supported on sulphated SnO2/multi-walled carbon nanotube composites for methanol electrooxidation*. Journal of Power Sources, 2012. 198(0): p. 127-131.
13. Ye, J., et al., *Preparation of Pt supported on WO3-C with enhanced catalytic activity by microwave pyrolysis method*. Journal of Power Sources, 2010. 195(9): p. 2633-2637.
14. Weidner, J. W. and B. L. Garcia, Electrocatalyst support and catalyst supported thereon US 2009/0065738 A1, 2009: United States.
15. Cai, M., et al., Electrocatalyst Supports for Fuel Cells US 2007/0037041 A1, 2007: United States.
16. Do, T. B., M. Cai, and M. S. Ruthkosky, Mesoporous electrically conductive metal oxide catalyst supports WO 2009/152003 A2, 2009.
17. Adzic, R., J. Zhang, and M. Vukmirovic, Electrocatalyst for oxygen reduction with reduced platinum oxidation and dissolution rates US 2006/0263675 A1, 2006: United States.
18. Adzic, R., M. Vukmirovic, and K. Sasaki, *Synthesis of metal-metal oxide catalysts and electrocatalysts using a metal cation adsorption/reduction and adatom replacement by more noble ones* U.S. Pat. No. 7,704,918 B2, 2010: United States.
19. Hartl, K., et al., *AuPt core-shell nanocatalysts with bulk Pt activity*. Electrochemistry Communications, 2010. 12(11): p. 1487-1489.
20. Ma, Y., et al., *High active PtAu/C catalyst with core-shell structure for oxygen reduction reaction*. Catalysis Communications, 2010. 11(5): p. 434-437.
21. Sasaki, K., et al., *Core-Protected Platinum Monolayer Shell High-Stability Electrocatalysts for Fuel-Cell Cathodes*. Angewandte Chemie International Edition, 2010. 49(46): p. 8602-8607.
22. Shuangyin, W., et al., *Controlled synthesis of dendritic Au@Pt core-shell nanomaterials for use as an effective fuel cell electrocatalyst*. Nanotechnology, 2009. 20(2): p. 025605.
23. Silva, J. C. M., et al., *Ethanol oxidation reactions using SnO2@Pt/C as an electrocatalyst*. Applied Catalysis B: Environmental, 2010. 99(1-2): p. 265-271.
24. Wang, R., et al., *Carbon supported Pt-shell modified PdCo-core with electrocatalyst for methanol oxidation*. International Journal of Hydrogen Energy, 2010. 35(19): p. 10081-10086.
25. Wang, R., et al., *Preparation of carbon-supported core@shell PdCu@PtRu nanoparticles for methanol oxidation*. Journal of Power Sources, 2010. 195(4): p. 1099-1102.
26. Wang, W., et al., *Pt overgrowth on carbon supported PdFe seeds in the preparation of core-shell electrocatalysts for the oxygen reduction reaction*. Journal of Power Sources, 2010. 195(11): p. 3498-3503.
27. Wei, Z. D., et al., *Electrochemically synthesized Cu/Pt core-shell catalysts on a porous carbon electrode for polymer electrolyte membrane fuel cells*. Journal of Power Sources, 2008. 180(1): p. 84-91.
28. Wu, Y.-N., et al., *High-performance core-shell PdPt@Pt/C catalysts via decorating PdPt alloy cores with Pt*. Journal of Power Sources, 2009. 194(2): p. 805-810.
29. Lopez, M., et al., *Core/Shell-type catalyst particles comprising metal or ceramic core materials and methods for their preparation*, WO2008/025751. 2008.

30. Guerin, S. and B. E. Hayden, *Physical Vapor Deposition Method for the High-Throughput Synthesis of Solid-State Material Libraries*. Journal of Combinatorial Chemistry, 2006. 8(1): p. 66-73.
31. Guerin, S., et al., *High-Throughput Synthesis and Screening of Ternary Metal Alloys for Electrocatalysis*. The Journal of Physical Chemistry B, 2006. 110(29): p. 14355-14362.

The invention claimed is:

1. A core-shell catalyst consisting of a core particle and a shell catalyst, wherein said core particle has a diameter of from 10-50 nm and comprises a mixed metal oxide material of titanium and tantalum, the mixed metal oxide material comprising between 1 and 20 atomic % titanium, based on metal content, and wherein said shell catalyst comprises 1 to 20 monolayers of a catalyst material.

2. The core-shell catalyst of claim 1, wherein the catalyst material comprises platinum or platinum alloy.

3. The core-shell catalyst as claimed in claim 2, wherein the shell catalyst comprises approximately 4.6 to 20 monolayers of platinum or platinum alloy.

4. The core-shell catalyst as claimed in claim 3, wherein the shell catalyst consists of approximately 4.6 to 20 monolayers of platinum or platinum alloy.

5. The core-shell catalyst as claimed in claim 2, wherein the shell catalyst consists of approximately 1 to 20 monolayers of platinum or platinum alloy.

6. The core-shell catalyst as claimed in claim 5, wherein the mixed metal oxide material is titanium-doped tantalum oxide in a crystalline form.

7. The core-shell catalyst as claimed in claim 5, wherein the shell catalyst consists of approximately 1 to 20 monolayers of platinum.

8. The core-shell catalyst as claimed in claim 2, wherein the shell catalyst comprises approximately 6.5 to approximately 9.3 monolayers of platinum or platinum alloy.

9. The core-shell catalyst as claimed in claim 8, wherein the shell catalyst consists of approximately 6.5 to approximately 9.3 monolayers of platinum or platinum alloy.

10. The core-shell catalyst as claimed in claim 1, wherein the mixed metal oxide material comprises between 1.3 and 15.8 atomic % titanium.

11. The core-shell catalyst as claimed in claim 1, wherein the mixed metal oxide material is formed of tantalum oxide doped with titanium.

12. The core-shell catalyst as claimed in claim 11, wherein the titanium-doped tantalum oxide is in a crystalline form.

13. The core-shell catalyst as claimed in claim 1, wherein the core particle consists of the mixed metal oxide material.

14. A fuel cell comprising the core-shell catalyst as claimed in claim 1.

15. A method of producing a core-shell catalyst, the method comprising: forming a core particle having a diameter of from 10-50 nm and comprising a mixed metal oxide material of titanium and tantalum, the mixed metal oxide material comprising between 1 and 20 atomic % titanium, based on metal content; and forming a catalytic shell layer comprising 1 to 20 monolayers of a catalyst material on the core particle.

16. The method as claimed in claim 15, wherein the mixed metal oxide material comprises between 1.3 and 15.8 atomic % titanium.

17. The method as claimed in claim 15, wherein the shell layer comprises 1 to 20 monolayers of platinum or platinum alloy.

18. The method as claimed in claim 15, wherein the shell layer comprises approximately 4.6 to 20 monolayers of platinum or platinum alloy.

19. The method as claimed in claim 15, wherein the shell layer comprises approximately 6.5 to approximately 9.3 monolayers of platinum or platinum alloy.

20. The method as claimed in claim 15, wherein the mixed metal oxide material is formed of tantalum oxide doped with titanium.

21. The method as claimed in claim 20, wherein the titanium-doped tantalum oxide is in a crystalline form.

* * * * *